Figure 1:
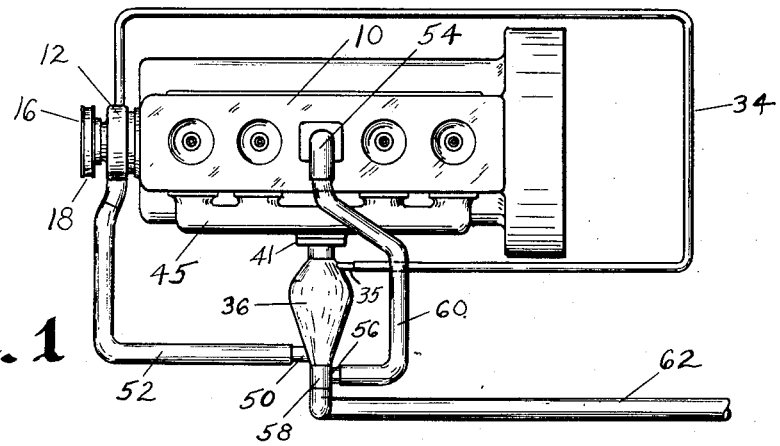

May 15, 1951     B. M. CRAWFORD     2,553,361
HEAT EXCHANGE DEVICE

Filed May 3, 1948

INVENTOR
BISHOP M. CRAWFORD
BY
Rey Eilers
ATTORNEY

UNITED STATES PATENT OFFICE 2,553,361

HEAT EXCHANGE DEVICE

Bishop Madison Crawford, St. Louis, Mo.

Application May 3, 1948, Serial No. 24,782

2 Claims. (Cl. 257—241)

This invention relates to improvements in heat exchange devices. More particularly, this invention relates to improvements in heat exchange devices which can be used to preheat water introduced into the water-cooling systems of internal combustion engines.

It is therefore an object of the present invention to provide an improved heat exchange device which can be used to preheat water introduced into the cooling systems of internal combustion engines.

It oftentimes happens that internal combustion engines, which are not primarily intended for marine work, are converted for use in boats. For example, automobile engines are frequently installed in boats and used to drive the propellers. In such instances, it is customary to draw water into the boat through a scoop, located on the exterior of the boat, and pass that water through the block of the engine. Such water effectively dissipates heat from the engines and thus permits efficient operation of the engines despite the heavy loads imposed by the propellers. The temperature of the water in rivers and streams is usually quite low, and the introduction of such water directly into the block of an engine can reduce the operating temperature of the cylinders of that engine to an undesirable value. In recognition of this fact, it has become customary in converting internal combustion engines to marine work to provide a heat exchange device that uses the heat from the products of combustion of the engine to preheat the water introduced into the block of the engine; and these heat exchange devices customarily take the form of a casting which encloses the exhaust manifold of the engine. Such devices transfer heat from the products of combustion to the water; and when the preheated water passes into the block of the engine it will provide adequate cooling of the engine while avoiding excessively low temperatures in the cooling system of the engine. Heat exchange devices of this type are workable, but the castings are expensive and they require the removal of the exhaust manifold of the engine. For these reasons, prior heat exchange devices for converting internal combustion engines to marine work are objectionable. The present invention obviates this objection by providing a heat exchange device which can be bolted directly to the exhaust manifold of an engine without requiring removal of that manifold. It is therefore an object of the present invention to provide a heat exchange device that can be bolted directly to the exhaust manifold of an engine.

The space limitations in boats are oftentimes as critical as, if not more critical than, those in land vehicles; and therefore it is imperative that the heat exchange devices used in preheating the water for the engines in boats be as compact as possible. The present invention provides a compact but effective heat exchange device by providing a large diameter heat transferring surface in the form of a shell and by providing a gas deflector within that shell. The gas deflector performs a dual function; one function being to direct exhaust gases outwardly into contact with the surface of the shell of the heat exchange device, and the second function being to cause such a turbulence and mixing of the exhaust gases as will prevent stratification of those gases. In this way the heat exchange device provided by the present invention attains a large heat transferring surface which is always contacted by fresh quantities of exhaust gases. As a result, it is impossible for part of the exhaust gases within the shell to cool appreciably and act as a sheath which insulates the shell from the body of the exhaust gases. It is therefore an object of the present invention to provide a heat exchange device with a gas deflector which directs exhaust gases outwardly against the surface of the shell and which also provides turbulence and mixing of the exhaust gases.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purposes of illustration only and that the invention will be defined by the appended claims.

In the drawing

Figure 2:
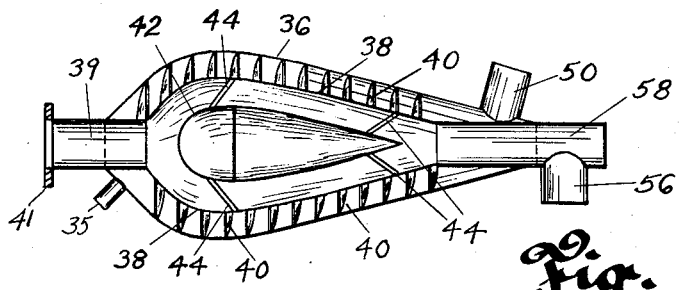
Figure 3:
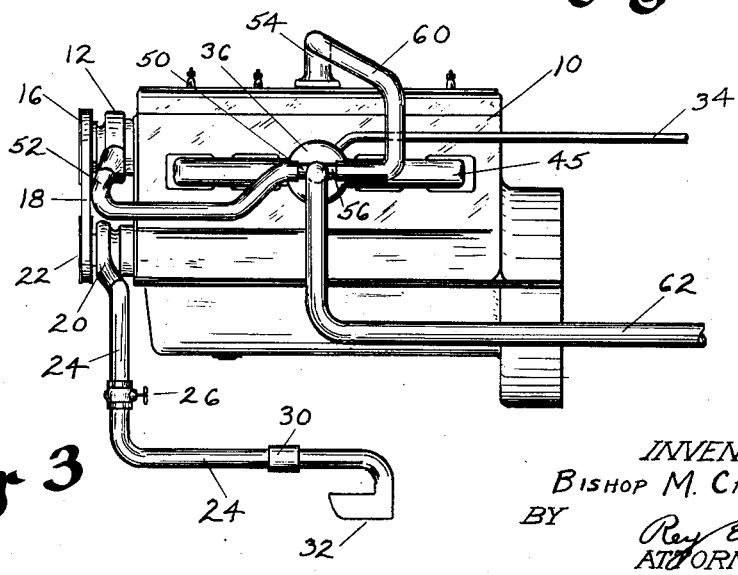

Fig. 1 is a plan view of an internal combustion engine and a heat exchange device connected thereto, Fig. 2 is a cross sectional, side elevational view of the heat exchange device shown in Fig. 1, and Fig. 3 is a side elevational view of the engine and heat exchange device shown in Fig. 1.

Referring to the drawing in detail, the numeral 10 denotes an internal combustion engine which can be mounted in, and used to drive, a boat. The numeral 12 denotes a water pump which is directly mounted in front of the engine 10 and is operated by the shaft of that engine. The shaft which drives the pump 12 also carries a pulley 16. A belt 18 is supported by the pulley 16, and that belt extends downwardly to a pulley 22 on the shaft of an auxiliary pump 20. The auxiliary pump 20 is not needed with engines used on land vehicles but is customarily used in boats to draw water from the exterior of the boat and lift it to the level of the pump 12.

A pipe 24 is secured to the inlet of the auxiliary pump 20, and that pipe extends downwardly and rearwardly of the engine. A manually operated valve 26 is provided intermediate the ends of the pipe 24; and that valve is preferably of the type that can be adjusted from a full "on" position to a full "off" position and will remain in any adjusted position. A check valve 30 is provided in that portion of pipe 24 which extends rearwardly from the valve 26. This check valve readily passes water drawn through pipe 24 from inlet 32, but it keeps that water from leaking out of the pipe 24. In this way, once a head of water has been established above the check valve 30, that head of water will always be maintained and can be replenished at any time the pump 20 is operating. The intake 32 is in the form of a scoop and it is positioned externally of the boat in which the engine 10 is mounted. This inlet will direct water into pipe 24 whenever the boat is moving ahead; and it will, when the valve 26 is open, assist pump 20 in moving water through pipe 24.

A pipe 34 is connected to the outlet of auxiliary pump 20, and it extends around the side and rear of the engine 10. The pipe 34 extends to and is directly connected with the inlet 35 of the housing 36 of the heat exchange device provided by the present invention. That heat exchange device has a heat transferring shell 38 positioned within the housing 36 but spaced from it. Both the housing 36 and the shell 38 have a generally tear drop configuration with enlarged diameters adjacent the front portions thereof. The housing 36 and the shell 38 are preferably formed and dimensioned so the area of the space between the interior of the housing 36 and the exterior of the shell is as great, or greater, than the area of the pipe 34. The space between the interior of housing 36 and the exterior of shell 38 is preferably divided into a number of passages for water; such passages being conveniently formed by a continuous strip 40 of metal which engages both the shell 38 and the housing 36. The strip 40 has its leading edge adjacent the front of the shell 38, and it has its trailing edge adjacent the rear of that shell; and it preferably has the general form of a helix. The inner surface of the helical strip 40 is placed in intimate thermal contact with the shell 38, as by welding, soldering, brazing, or other means; and the outer surface of that strip is placed in intimate thermal contact with the housing 36, as by welding, brazing, soldering, or other means.

With this construction, the water from the pipe 34 will be forced to follow a generally helical path through the housing 36 before it reaches the outlet 50 of housing 36. At such time, the water will enter pipe 52 which extends to the inlet port of the pump 12 driven by the engine 10. Once in pump 12, the water will be forced into and through the cooling passages of the block of the engine 10; eventually exhausting from the block at the outlet 54. The exhausting water is led from outlet 54 to a port 56 in the tail pipe 58 of the heat exchange device by a pipe 60. The tail pipe 58 is directly connected to the exhaust pipe 62 of the boat.

A streamlined gas deflector 42 is positioned within the shell 38, and that deflector has a configuration which is generally similar to the configuration of the shell 38; but the deflector 42 has a closed front which deflects gases outwardly and into contact with the shell 38. The area of the space between the interior of shell 38 and the exterior of deflector 42 is preferably equal to, or greater than, the area of the pipe 39.

The deflector 42 is held in position within the shell 38 by struts 44 which are welded, brazed, soldered, or otherwise secured to the shell 38 and to the deflector 42. The deflector 42 directs incoming gases from pipe 39 outwardly against the interior surface of shell 38 and causes those gases to experience considerable turbulence and movement. This positively avoids stratification of the exhaust gases; and this is desirable, because in the absence of such a deflector the gases would tend to stratify and pass directly through the shell 38 in a small diameter stream. Some gases would, of course, even without a deflector, tend to move outwardly into the enlarged area of the large diameter portions of housing 36; but those gases would tend to become "dead" gases and eddy about, while the greater volume of the exhaust gases would flow directly through the center of shell 38. In such a case, the greater volume of the exhaust gases would transmit but little heat to the shell 38. By being deflected outwardly into contact with the shell 38 by the deflector 42, and also by being given considerable turbulence, the exhaust gases are enabled to transmit a large quantity of heat to the shell 38.

The exhaust gases entering the shell 38 come from the manifold 45 of the engine 10. This manifold is of customary form and construction, and it is provided with an outlet to which the exhaust pipe normally is secured. With the present invention, the flanged end 41 of the pipe 39 is bolted or otherwise secured to that flanged end of the manifold 45, and thus a gas tight connection is formed between the manifold 45 and the heat exchange device. With this construction the exhaust gases from the engine will pass through the heat exchange shell 38 and transmit considerable quantities of heat to that shell. These quantities of heat will be absorbed by the water from pipe 34 and will heat that water to the desired level. The preheated water will be forced into the cooling passages of the block by pump 12 and will maintain the proper heat conditions within the engine 10.

The helical strip 40 between the shell 38 and the housing 36 prevents straight-line flow of the water introduced into the housing 36. As a result, that water must constantly change direction, and in doing so it experiences turbulence. This turbulence prevents stratification of the water; and by doing so it keeps part of that water from becoming warmed by contact with the shell 38 and then acting to isolate the rest of the water from that shell. Similarly, the deflector 42, by causing turbulence of the exhaust gases, keeps a portion of those gases from contacting the shell 38, becoming cool, and then isolating the rest of those gases from the shell 38. In this way, considerable turbulence is experienced adjacent both the inner and outer surfaces of the shell 38, and thus efficient heat transfer is obtained between the hot products of combustion of the engine 10 and the relatively cool water in the space between the shell 38 and the housing 36.

The exact amount of heat added to the water by the heat exchange device is easily regulated by the setting of the manual control valve 26. That valve should be closed when the engine is first started so the water in the engine block can be quickly raised to the desired temperature. The temperature of the water in the engine block can be conveniently determined by a thermometer of the type customarily employed with engines to indicate the temperature of the cooling water. Once the water reaches the desired value, the valve 26 is opened to admit cool water to the system. This water will pass successively through inlet 32, check valve 30, manually operated valve 26, pump 20 and housing 36 to pump 12. At the time it reaches pump 12, that water will be at the desired temperature and will cool the engine 10 without excessively lowering the temperature of the cylinders thereof. If desired, the manually operated valve 26 can be replaced with a thermally responsive valve. Such a valve will automatically meter the introduction of cool water to maintain the temperature within the block at the desired value.

Tests made with the heat exchange device provided by the present invention have shown it to be surprisingly efficient. The housing 36 was made with an overall length of twelve (12) inches and with its largest diameter seven (7) inches; and the shell 38 was made with an overall length of eight and one quarter (8¼) inches and with its largest diameter five inches. The deflector was made seven (7) inches long and with its largest diameter three (3) inches. With the valve 26 in full "on" position, water at forty (40) degrees Fahrenheit was raised to a temperature of one hundred twenty (120) degrees Fahrenheit by one pass through the heat exchange device. By slightly reducing the amount of flow through the valve 26, the temperature of the forty (40) degree water was raised to one hundred fifty five (155) degrees in one pass through the heat exchange device. This temperature was readily attained, and it provided exceedingly efficient operation of the engine. The tests were made on a four cylinder, forty-five (45) horsepower Overland Whippet engine; but the device can easily be dimensioned for use on larger and smaller engines.

If desired, the deflector 42 could be provided with an inlet and an outlet and could transmit heat to the water. In such a case, a set of connections would be provided that would conduct water into and out of the hollow center of the deflector. The deflector 42 could be placed in series or parallel with the water passage in the housing 36 by suitable pipes and connections.

The heat exchange device provided by the present invention is particularly useful with engines in boats; but it can be used in other heating and cooling installations. For example, that device can be used to heat air; products of combustion flowing through shell 38 and air flowing through the space between housing 36 and shell 38. Also, the device can be used to cool oil; cool water flowing through the space between housing 36 and shell 38 and oil flowing through shell 38.

Whereas a preferred embodiment of the present invention has been shown and described in the drawing and accompanying description it should be obvious to those skilled in the art that various changes may be made in the form of the invention without affecting the scope thereof.

What I claim is:

1. A heat exchange device that comprises a housing of tear drop configuration, a heat transferring shell of tear drop configuration positioned within said housing but spaced therefrom, the large end of said shell being adjacent the large end of said housing, an inlet duct passing through and being sealed to said housing and being directly connected to the leading end of said shell, a flange on said inlet duct for securing said device to a source of heat, an outlet duct passing through and being sealed to said housing and being directly connected to the trailing end of said shell, said housing, said shell, and said inlet and outlet ducts forming a fluid-receiving space, a fluid-directing element positioned within said space, said element being a continuous strip of metal on said shell in the form of a helix, the turns of said helix being equally spaced apart, said element preventing straight-line flow through said space, an inlet and outlet for said space, a deflector positioned within said shell, said deflector having a tear drop configuration, said deflector having the large end thereof adjacent the large end of said shell and in register with said inlet duct, thereby preventing straight-line flow through said shell, and struts supporting said deflector, the positioning of the large end of said shell adjacent the large end of said housing and the positioning of the large end of said deflector adjacent the large end of said shell coacting with the tear drop configuration of said housing, shell and deflector to force fluids outwardly against the inner surfaces of said housing and shell and then force said fluids inwardly toward said shell and deflector.

2. A heat exchange device that comprises a housing of tear drop configuration, a heat transferring shell of tear drop configuration positioned within said housing but spaced therefrom, the large end of said shell being adjacent the large end of said housing, an inlet duct passing through and being sealed to said housing and being directly connected to the leading end of said shell, an outlet duct passing through and being sealed to said housing and being directly connected to the trailing end of said shell, said housing, said shell, and said inlet and outlet ducts forming a fluid-receiving space, a fluid-directing element positioned within said space, said element providing a helical path for fluid introduced into said space, an inlet and outlet for said space, and a deflector positioned within said shell, said deflector having a tear drop configuration, said deflector having the large end thereof adjacent the large end of said shell and in register with said inlet duct, thereby preventing straight-line flow through said shell, the positioning of the large end of said shell adjacent the large end of said housing and the positioning of the large end of said deflector adjacent the large end of said shell coacting with the tear drop configuration of said housing, shell and deflector to force fluids outwardly against the inner surfaces of said housing and shell and then force said fluids inwardly toward said shell and deflector.

BISHOP MADISON CRAWFORD.

REFERENCES CITED

The following references are of record in the file of this patent:

UNITED STATES PATENTS

| Number | Name | Date |
| --- | --- | --- |
| 325,742 | Hayes | Sept. 8, 1885 |
| 627,774 | Fairley | June 27, 1899 |
| 1,291,564 | Lavender | Jan. 14, 1919 |
| 1,613,615 | Lippert | Jan. 11, 1927 |
| 2,135,235 | Hurfore et al. | Nov. 1, 1938 |

FOREIGN PATENTS

| Number | Country | Date |
| --- | --- | --- |
| 8,500 | Great Britain | Apr. 3, 1914 |
| 547,263 | Great Britain | Aug. 20, 1942 |
| 881,258 | France | Jan. 22, 1943 |